United States Patent [19]

Krstic

[11] Patent Number: 5,338,523

[45] Date of Patent: * Aug. 16, 1994

[54] METHOD OF MAKING TRANSITION METAL CARBIDE AND BORIDE POWDERS

[76] Inventor: Vladimir D. Krstic, 7 Lochinvar Road, Kingston, Ontario, Canada, K7M 6R9

[*] Notice: The portion of the term of this patent subsequent to Nov. 24, 2009 has been disclaimed.

[21] Appl. No.: 966,376

[22] Filed: Oct. 26, 1992

[51] Int. Cl.⁵ .................. C04B 35/56; C01B 31/30; C01B 35/04; C01B 31/34
[52] U.S. Cl. ........................ 423/289; 423/297; 423/439; 423/440; 51/307
[58] Field of Search ............ 423/439, 440, 289, 297; 501/87, 93, 96; 51/307

[56] References Cited

U.S. PATENT DOCUMENTS

| | | | |
|---|---|---|---|
| 4,008,090 | 2/1977 | Miyake et al. | 423/440 |
| 4,121,946 | 10/1978 | Chuiko et al. | 106/308 N |
| 4,664,899 | 5/1987 | Kimmel et al. | 423/440 |

FOREIGN PATENT DOCUMENTS 811906  4/1959  United Kingdom ............... 423/440

Primary Examiner—Michael Lewis
Assistant Examiner—Stephen G. Kalinchak

[57] ABSTRACT

A process for the production of high purity, high surface area, submicron size transition metal carbides and borides which comprises mixing transition metal oxide with carbon in an amount sufficient to form the corresponding carbide or boride, heating the reactants at a temperature of higher than 1000° C. under a small pressure of non-reacting gas and then holding the temperature whilst applying simultaneously subatmospheric pressure and agitation until the reaction is complete.

11 Claims, No Drawings

METHOD OF MAKING TRANSITION METAL CARBIDE AND BORIDE POWDERS

FIELD OF INVENTION

The invention is directed to the production of transition metal carbides and borides in the powder form. More specifically, this invention is directed to the production of high purity, high surface area transition metal carbide and boride powders USING oxides as starting materials.

BACKGROUND OF THE INVENTION

Because of their high hardness, transition metal carbides are particularly useful in applications such as armour plating, blasting nozzles, mechanical seals, and cutting and grinding tools. Some of them are also used in the shielding and control of unclear reactors ($B_4C$) due to its neutron absorptivity, chemical inertness, and radiation stability, while the others are used to manufacture composites such as $TiO_2$-SiC.

One of the major problems associated with the use of transition metal carbides both in monolithic form or alloyed with other ceramics, is their low diffusivity and thus low sinterability. Their fabrication to full density requires very high temperatures and a powder of submicron size. Considering that the grain size in densified parts is determined by the size of the particles from which the parts are fabricated, it is advantageous to fabricate parts from powders comprised from fine, submicron-size particles.

Currently, the primary process for the production of titanium carbide powders involves the reduction of titanium dioxide ($TiO_2$) with carbon source at temperatures in the range of 1700° C. to 2100° C. (Bit. Patent No. 811, 906, 1959).

The titanium carbide so produced has wide particle size range normally much greater than one micron due to high reaction temperatures and long reaction times. Further, undesirable inhomogeneities are frequently found in the stationary reaction mix due to diffusion gradients established during the reduction reaction. In essence, these inhomogeneities exist due to the lack of intensive mixing of the bed during the reaction.

Commercial production of boron carbide is most commonly carried out by the reduction of boron oxide with carbon in a batch electric furnace (U.S. Pat. No. 3,161,471). Because of the slow rate of heat conduction, the time required to complete the reaction is very long, on the order of days. The sintered mass of product that results from this process requires physical size reduction in order to achieve a particle size a small enough for densification. Because of the very high hardness of boron carbide, this size reduction step is extremely difficult and expensive and results in contamination of the product.

Another method for manufacturing boron containing ceramic powders is by reduction of boron oxide with magnesium metal, the so-called termite reaction (U.S. Pat. No. 2,834,651). In this process, reactants boron oxide, carbon, and magnesium are intimately mixed, loaded into a container, and the reaction initiated either by heating the reaction mixture to a sufficiently high temperature or through the use electrical igniters. This reaction is highly exothermic and self-propagating. The carbide powders produced by the termite process are unsatisfactory for high-purity applications because of contamination with magnesium.

In order to avoid these problems, researcher have sought methods of producing, high-purity, submicron size powders using direct synthesis from laser-heated or plasma-heated gases. Knudsen (Advances in Ceramics: Ceramic Powder Science 21, 237, 1987) described the synthesis of $B_4C$ powders by the $CO_2$ laser-driven pyrolysis of $BCl_3/H_2/CH_4(C_2H_4)$ gas mixtures.

Various other submicron-size boron containing powders, including titanium diboride ($TiB_2$) have also been sinthesized from plasma-heated gases (U.S. Pat. No. 4,266,977). Although the laser or plasma heating process has a number of advantages such as fast heating rates, short reaction times and submicron particle size, the high cost of processing equipment, low production rates and expensive gaseous raw materials make this process commercially unattractive.

SUMMARY OF THE INVENTION

In accordance with the present invention there is a method of making transition metal carbide powders, comprising mixing selected oxide powders with carbon powder, as reactants; heating the reactants in a reaction chamber under non-reactive gas pressure which maintains a carbon monoxide partial pressure sufficient to keep the loss of carbon or oxide to an acceptable level until the reactants reach a temperature in access of 1200° C. to cause the reactants to react to form the corresponding carbide or boride and carbon monoxide while agitating the carbon and oxide powder mixture and applying a subatmospheric pressure to the reactants which is sufficient to remove carbon monoxide gas from the reaction chamber and to drive the reaction to completion in a short period of time.

The reduced pressure (vacuum) is preferably less than 1000 millitorrs and more preferably less than 500 millitorrs and greater than 30 millitorrs. The pressure should not be so low as to draw off either the reactants or the product. An acceptable minimum pressure of the reactants and the product will depend on the reaction temperature and reaction time.

The major object of the invention are to:
(i) eliminate the need for two separate steps involving reduction and carburization or boridizaton
(ii) eliminate the use of hydrogen thereby eliminate particle growth assisted by the water vapour deposition
(iii) minimize the loss of carbon or oxide components when reacting at high temperatures (1600° C.)
(iv) eliminate milling operation
(v) eliminate acid leaching
(vi) minimize the level of undesirable residual oxygen Constant mixing by means of rotation employed in the present invention provides excellent homogenization which, when combined with high vacuum, provides the conditions for a substantial increase in reaction rates, decrease in the level of unreacted oxides, and reduction in the loss of reactants. The process thus provides conditions for a large scale commercial production of submicron size, high-purity, high-surface area powders suitable for advanced ceramic components manufacturing.

DETAILED DESCRIPTION OF THE INVENTION

As generally described above, the present invention is directed to a method for preparing high purity transition metal carbide and boride powders of high surface area and grain sizes ranging from submicron to several micron with a greatly increased reaction rates. Transition metal carbide and borides are defined, for the purpose of this invention, as carbides of the elements which have unfulfilled d-orbitals. These elements are: V, Cr, Mn, Fe, Co, Ni, Sc, Os, Zr, Nb, Mo, Ru, La, Hf, Ta, Re, Ac and B.

In the caurse of the experimental work in the development of the present invention, it was found that the temperature gradient in the reactants and the partial pressure of CO, are the two most critical parameters in the overall carbothermic reduction of transition metal oxides to their carbides and borides. Further, unlike earlier proposals which generally specify just one set of conditions for the entire process, it has been discovered and realized that the process can be divided into two distinct steps, namely: (i) a heating step in which the reactants are heated to the reaction temperature; and (ii) a reaction step in which the reactants are held at the desired, elevated reaction temperature.

For illustrative purposes, the formation of transition metal carbides and borides, using oxides as raw materials, may be represented by the following reactions:

$$TiO_2 + C \rightarrow TiO + CO \qquad (1)$$

$$TiO + C \rightarrow Ti + CO \qquad (2)$$

$$Ti + C \rightarrow TiC \qquad (3)$$

or $$TiO_2 + 3C \rightarrow TiC + 2CO \qquad (4)$$

Boron carbide can be synthesized by the carbothermal reduction of liquid-phase boron oxide by the overall stoichiometric reaction:

$$2B_2O_3(l) + 7C(s) \rightarrow B_4C(s) + 6CO(g) \qquad (5)$$

However, if gaseous boron suboxide ($B_2O_2$) is formed in the course of reduction reaction, boron carbide may be formed through the gas/solid reaction:

$$B_2O_3(l) + C(s) \rightarrow B_2O_2(g) + CO(g) \qquad (6)$$

$$B_2O_2(g) + 5C(s) \rightarrow B_4C(s) + 4CO(g) \qquad (7)$$

Similarly, titanium diboride can be synthesized by carbothermal reduction according to the overall stoichiometric reaction:

$$TiO_2(s) + B_2O_3(l) + 5C(s) \rightarrow TiB_2(s) + 5CO(g) \qquad (8)$$

Similar reactions are used to describe the synthesis of other transition metal carbides and borides.

Evidently, the reduction of both $TiO_2$ and $B_2O_3$ to their carbides is controlled by the partial pressure of CO gas.

The processing steps of the invention are:
a) Mixing of transition metal oxides, or oxide containing compounds, with powdered carbon source when producing transition metal carbides, or mixing selected transition metal oxide and boron oxide or suitable boron containing compounds, with powdered carbon source in a substoichiometric ratios when producing borides.
b) Heating the mixture in a rotary furnace under argon or CO gas pressure of at least 10 psi above atmospheric pressure until the reaction mixture reaches a temperature of 1000° C. to 1800° C.
c) Holding the mixture at required temperature under vacuum for different times ranging from 30 minutes to several hours to produce selected carbide or boride.

In process step (a) sufficient carbon is added to ensure complete reduction of all oxides and carburization or boridization of metals. Powder mixing and their pelletizing is preferably done in an Eirich Mixer in order to produce pellets in the range of 1 to 5 mm. Mixing time should be sufficient to produce a uniform blend, i.e. generally 1 to 6 hours.

Step (b) is basically to reduce the loss of volatile components, such as $B_2O_2$ and eliminate decarburization of carbides or decomposition of borides at an early stage of the reaction.

Step (c) serves to provide complete carburization in the case of carbide formation, or boridization in the case of boride formation. Temperatures in excess of 1400° C. are normally necessary for the reduction of oxides. The time and temperature required for the completion of the reactions depend on the partial pressure of CO. Simultaneous rotation of the pelletized bed and high vacuum were found to greatly reduce the reaction time and eliminate unhomogeneities in the final products. In the present invention, the time required for a complete conversion of transition metal oxides into carbides was found to be as low as 40 minutes. The added advantage of a continuous bed rotation is that it provides a useful means by which a tight control of carbon and oxygen can be maintained. The intense mixing of the pelletized bed by means of agitation or vibration, eliminates entirely the limits imposed on the bed thickness and provides means by which a large scale industrial production of transition metal carbides and borides can be accomplished. Contrary to other known processes, the present process does not require the use of nitrogen or hydrogen gas.

A resistant graphite furnace such as, for example, a rotary tube furnace was found to be particularly suitable for this process, although any other furnace which can withstand process conditions may be used.

In order to avoid excessive loss of reactant components from the system, and in particular to avoid depletion of carbon component from the surface of the carbide particle formed in the early stages of reaction, the system is pressurized with non-reactive gas such as carbon monoxide or argon and maintained until the reaction temperature has been reached. It was discovered that a pressure of 0.138 MPa (20 psi) above atmospheric is sufficient to limit the loss of carbon and thus limit the decarburization of carbides. In the case of boride formation, the pressure is sufficient to greatly minimize the loss of volatile $B_2O_2$ oxide.

Above about 1400° C., the rate of carbide formation becomes high and a vacuum is applied to the reaction chamber in order to promote the removal of carbon monoxide and to enhance the reaction rate of carbide and boride formation. The system was evacuated until the pressure was less than 1000 millitorrs. Simultaneously with the application of vacuum, the bed of the homogeneous reactant mix was turned to agitate the reactants and to promote free passage of the reaction inhibiting carbon monoxide gas. Application of vacuum, simultaneously with turning or agitation of an initially homogeneous mix, employed for the first time in this invention, was found to be essential for the production of large quantities, high purity and reproducible quantity transition metal carbide and boride powders. Furthermore, the combination of high vacuum and continuous bed mixing provides the condition for shortening the reaction time and lowering the reaction temperature. The reaction time is directly related to:
a) reactant particle size
b) reaction temperature
c) the level of vacuum applied, and
d) the rate and efficiency of agitation.

After the reaction of carbide or boride formation was completed, the powder was discharged from the furnace. The free carbon content and the oxygen level of the powder obtained depend on the carbon to oxide molar ratio in the original homogeneous mix, the reaction temperature and time, the level of vacuum, and the mixing conditions. The free (unreacted) carbon content typically ranges from 0.02 wt % to 0.2 wt %. Unreacted oxide, as measured by neutron activation and x-ray techniques was typically less than 0.2 wt %. The specific surface area of the carbide powders was a minimum of 1 85 $m^2/g$., typically greater than 15.2 $m^2/g$. The relative surface area of the powders depends on (a) processing temperature, (b) reaction time, and (c) reactant particle size.

It is to be understood that the process as described above is a preferred embodiment of the invention and the values given for particle size, reaction temperature, pressures and mix composition are those desired to produce transition metal carbides and borides of high purity and of high surface area. Carbides of lesser purity and of lower particle size can however be produced by deviating from the values of temperature, pressure and reactant particle size and purity set out above while remaining within the scope of the invention. For example, the reaction temperature can vary from the lowest values that will give very fine, high surface area powders with a minimum agglomeration, which is approximately 1400° C., to a maximum that will give coarse, agglomerated powders with low specific surface area, which is about 2200° C. Preferably, the reduced pressure is varied from about 30 millitorrs to about 1000 millitorrs can be used but this will increase the reaction time and require lower bed thicknesses.

Production of transition metal carbides and borides directly from oxides in one temperature cycle under vacuum and agitation, the "in-situ" produced metals are of high surface area and thus of extremely high reactivity with carbon which is prerequisite for fast carburization and boridization. The additional advantage of this process is that metal powders produced in the course of carbothermal reaction are not exposed to air at any stage prior to carburization or boridization but constantly subjected to a high vacuum which eliminates entirely their tendency for oxidation. The transition metal carbides and borides produced by the present invention are thus of submicron size and with oxygen content of less than 0.2 wt %.

In order to provide a more facile understanding of the present invention examples are set forth below which are illustrative only. Those skilled in the art will recognize that there are numerous modifications and variations and that present invention is not limited to such examples.

EXAMPLE 1

695 grams of $TiO_2$ powder with an initial surface area of 7.76 $m^2/g$, was mixed with 305 grams of carbon black with initial surface area of 8 $m^2/g$. The mixing and pelletizing was done in an Eirich Mixer for approximately 2 hours. The mix was loaded into a 15 mm diameter graphite retort and placed in a graphite resistance furnace possessing a variable speed-drive mechanism to provide rotation of the retort. The furnace was heated up to 1400° C. with a rate of heating of 50° C./min under one atmosphere absolute pressure of carbon monoxide without rotating the bed. Upon reaching the desirable temperature, the mix was held for approximately one hour, furnace cooled to room temperature and then removed from the furnace.

X-ray diffraction showed this powder to have a minimum 5 wt % unreacted $TiO_2$ and a minimum 4 wt % free Ti. The measured carbon total was 20.82 wt % and the measured free carbon was minimum 7 wt %.

EXAMPLE 2

695 grams of $TiO_2$ and 305 grams of carbon black of the same quality as per Example 1. were mixed and pelletized in an Eirich Mixer for approximately 2 hours. The mix was loaded into a 15 mm diameter graphite retort and placed in a graphite resistance heated furnace. The furnace was heated up to 1450° C. with the rate of heating of 50° C./min under full vacuum without rotating the retort. Upon reaching the desired temperature, the mix was held for one hour and then furnace cooled to room temperature and removed from the furnace.

X-ray diffraction showed this powder to have a minimum of 2 wt % $TiO_2$ and a minimum of 2 wt % Ti. The measured carbon total was 20.59 wt %, and the measured free carbon was maximum 4.6 wt %.

EXAMPLE 3

695 grams of $TiO_2$ and 305 grams of carbon black were mixed and pelletized as per Example 1. The mix was loaded into a 15 mm graphite retort and placed in a graphite resistance furnace. The furnace was heated up to 1450° C. with the rate of heating of 50° C./min. The rate of rotation of the retort was one rpm and the pressure in the furnace was kept at one atmosphere. Upon reaching the desired temperature, the mix was held for one hour and then furnace cooled to room temperature.

X-ray diffraction showed this powder to have a minimum of 2.5 wt % $TiO_2$ and a minimum of 2 wt % Ti. The measured carbon total was 20.48 wt %, and the measured free carbon was maximum 4.85 wt %.

EXAMPLE 4

695 grams of $TiO_2$ and 304 grams of carbon black was mixed and pelletized as per Example 1. The mix was loaded into a 15 mm diameter graphite retort and placed in a graphite resistance heated furnace. The furnace was heated up to 1450° C., with the rate of heating of 50° C./min. The rate of rotation was one rpm and the pressure in the furnace was kept at 0.136 MPa (20 psi). Upon reaching the desired temperature, the pressure was released and a vacuum was applied to establish and maintain a vacuum of 100 millitorrs. This pressure was reached after 30 minutes.

X-ray diffraction showed this powder to contain only TiC with no detectable amount of $TiO_2$ or Ti. The measured carbon total was 20.40 wt % and the free carbon was 0.40 wt %. the measured surface area of the powder was 15 m²/g and the average particle size was 0.2 to 1.0 microns.

Generally, the production of coarse titanium carbide is not so difficult, and other processes are available. However, where coarser titanium carbide is acceptable or required, coarser starting powder can be used together with higher reaction temperatures and longer times.

EXAMPLE 5

2472 grams of $H_3BO_3$ with an initial surface area of 4.4 m²/g and lost on ignition (LOI) of 42 wt % at 950° C., was mixed with 840 grams of carbon black with surface area of 8 m²/g. The mix was loaded into a graphite retort and placed in a graphite resistance furnace possessing a variable speed rotation mechanism. The furnace was heated up to 1700° C. at a rate of 50° C./minute under 20 psi absolute pressure of argon without rotation. The entire charge was held at 1700° C. for 2 hours, then furnace cooled to room temperature and removed from the furnace.

X-ray diffraction analysis showed this powder to contain at least 5 wt % boron oxide. The measured carbon total was 23 wt % and the measured free carbon was minimum 1.3 wt %.

EXAMPLE 6

2472 grams of $H_3BO_3$ and carbon black were mixed and loaded into a graphite retort and placed into the graphite resistance furnace as per Example 5. The furnace was heated up to 1800° C. under 20 psi absolute pressure of argon and with rotation of 1-2 rpm. Upon reaching 1800° C., the mixture was held for one hour or until the vacuum of 300 millitorrs was achieved. At this point the power was turned off and the charge was furnace cooled to room temperature.

X-ray diffraction showed this powder to contain no detectable amount of boron oxide or boron. The measured carbon total was 22.1 wt % and the measured oxygen was maximum 0.5 wt %. The measured surface area of the powder was minimum 7.6 m²/g.

EXAMPLE 7

1236 grams of $H_3BO_3$ with an initial surface area of 4.4 m²/g and LOI of 42 wt % at 950° C., was mixed with 799 grams of $TiO_2$ with an initial surface area of 8.08 m²/g, and 600 grams of carbon black with an initial surface area of 8 m²/g. The mixture was pelletized and loaded into graphite retort as per Example 5. The retort was heated up to 1700° C. with the rate of 50° C./min under 1 atm. absolute pressure and without rotation. Upon reaching 1700° C. the mixture was held for 3 hours, than furnace cooled to room temperature and removed from the furnace.

X-ray diffraction showed this powder to contain at least 5 wt % $TiB_2$, and at least 10 wt % boron oxide. The measured carbon total was 3.5 wt %.

EXAMPLE 8

2343 grams of $H_3BO_3$, 1499 grams of $TiO_2$ and 1081 grams of carbon black was mixed and pelletized as per Example 1. The mixture was loaded into the retort and heated up to temperature of 1700° C. at a rate of 50° C./min under 20 psi absolute pressure of argon. The retort was constantly rotated at a rate of 1.5 rpm. Upon reaching 1700° C., full vacuum was applied and held for approximately 60 minutes during which time subatmospheric pressure (vacuum) of 150 millitorrs was achieved.

The charge was furnace cooled to room temperature and then removed from the furnace.

X-ray diffraction showed this powder to contain only $TiB_2$ with no detectable amount of TiC or boron oxide. The measured carbon total was less than 0.5 wt % and the measured surface area was 0.95 m²/g. The measured oxygen content was maximum 0.5 wt %.

I claim:

1. A method of making transition metal carbides and borides, comprising mixing as reactants transition metal oxides with carbon powder, when producing carbides, or mixing as reactants transition metal oxides with carbon and boron oxide when producing transition metal borides, the method comprising the steps of: (i) heating the reactants in a reaction chamber under a non-reactive gas pressure until the reactants reach a temperature of between 1200 and 2000 degrees C. wherein the pressure is maintained at a level sufficient to prevent the substantial loss of oxide or carbon from the reactants; (ii) subsequently maintaining the temperature of the reactants between 1200 and 2000 degrees C. to force the reactants to react producing carbides or borides and carbon monoxide as a byproduct, and simultaneously applying a subatmospheric pressure to the reactants which is in the range from about 5 millitorrs to about 3000 millitorrs which pressure is sufficient to remove carbon monoxide from the reaction chamber, thereby the removal of the carbon monoxide drives the reaction to substantial completion.

2. A method as claimed in claim 1, wherein each of the carbon and transition metal oxide powders has a surface area above 2 m²/g.

3. A method as claimed in claim 1, wherein the reactants are any of the transition metal oxide containing compounds.

4. A method as claimed in any one of claims 1 and 2, wherein the carbon containing compounds are polymeric materials.

5. A method as claimed in claim 1, wherein the non-reactive gas comprises an inert gas or carbon monoxide or both.

6. A method as claimed in claim 1, wherein the pressure of the non-reactive gas is at least 0.034 MPa above atmospheric pressure.

7. A method as claimed in claim 1, wherein the carbon and oxide powder mixture is either continuously or intermittently agitated, and agitation is carried out during at least the step of maintaining the temperature whilst applying a subatmospheric pressure.

8. A method as claimed in claim 1, wherein the reactants are agitated by rotating the reaction chamber.

9. A method as claimed in claim 1, which is carried out in a reaction chamber formed from graphite, carbides or molybdenum.

10. A method of making a submicron size transition metal carbides, and borides, the method comprising the steps of: (i) mixing, as reactants, a submicron size carbon powder with transition metal oxide or any other transition metal containing compounds having a surface area above 2 m²/g; when producing carbides, or mixing, as reactions, a submicron size carbon powder with transition metal oxide and boron oxide, or any other boron containing compound when producing borides (ii) continuously heating the reactants in a reaction chamber under a non-reactive gas pressure of carbon monoxide which is greater than atmospheric pressure until the reactants reach a temperature between 1200–2200 degrees C. whilst maintaining the partial pressure of the carbon monoxide at the level sufficient to prevent substantial loss of carbon and/or oxide and; (iii) subsequently maintaining the temperature of the reactants between 1200 and 2200 degrees C. to cause the reactants to form transition metal carbide or boride and carbon monoxide, whilst applying a subatmospheric pressure in the reaction chamber in the range of 5–3000 millitorrs which is sufficient to remove carbon monoxide gas from the reaction chamber and to drive the reaction to substantial completion and agitating the reactants to prevent any pressure differential of carbon monoxide develop within the reactants which would inhibit the reaction and promote heat transfer to the reactants.

11. A method as claimed in any one of claims 1, and 10, in which the subatmospheric pressure within the reaction chamber and/or rate of gas production from the reactants is monitored, to determine when the reaction has been driven to substantial completion.

* * * * *